C. N. MORRIS.

Printers' Rules.

No. 5,736 Reissued Jan. 20, 1874.

Witnesses.
A. Ruppert
Geo. J. Bils

C. N. Morris
Inventor.
D. P. Holloway & Co
Attys

AM. PHOTO-LITHOGRAPHIC Co. N.Y. (OSBORNE'S PROCESS)

UNITED STATES PATENT OFFICE.

CHARLES N. MORRIS, OF CINCINNATI, OHIO.

IMPROVEMENT IN PRINTERS' RULES.

Specification forming part of Letters Patent No. 93,331, dated August 3, 1869; antedated July 20, 1869; reissue No. 5,736, dated January 20, 1874; application filed August 8, 1873.

*To all whom it may concern:*

Be it known that I, CHARLES N. MORRIS, of Cincinnati, in the county of Hamilton and State of Ohio, have invented an Improved Printer's Rule, of which the following is a specification:

The principal object of my invention is to provide a rule which will give lateral support to a line of type, with a special view of facilitating the forming and holding of curved lines of type.

The first part of my invention consists in furnishing a printer's rule at the ends with angular lips or flanges, to embrace the line of type at both ends, and thus firmly support it laterally. This form of rule is adapted to hold and support straight lines and single arch lines of type only. The second part of my invention provides the means for supporting, in like manner, lines of type of double or irregular curvature; and consists in connecting two suitably-curved rules by hooks or catches, which close up the ends of the channel between the rules, and clamp the latter firmly to the line of type between them. The interior rule is also curved a little more than the exterior one, so that it clamps the line of type by its own elasticity or inward spring.

Figure 1:
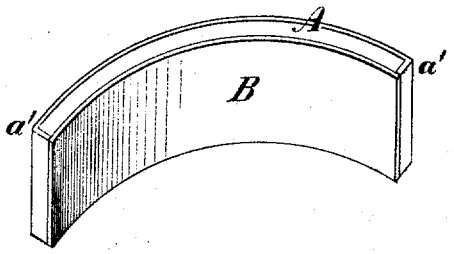
Figure 2:
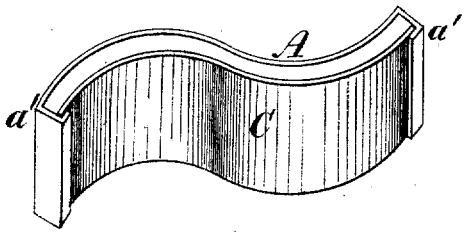

Figure 1 is a perspective view of my improved rule, constructed according to the first part of my invention. Fig. 2 is a perspective view of a rule or line-former embodying the second part of my invention, also showing the inward spring of the interior rule.

Similar reference letters indicate identical parts.

The rule A, made of brass or other suitable elastic metal, corresponds in contour to the form of the line of type to be sustained by it. The rule A (shown in Fig. 1) is provided at its ends with angular lips or shoulders *a'*, against which the end types of the line rest. Only a single rule of this description is required to support a line of type, either straight or arched, as shown in Fig. 1, a brace or interior rule, B, being employed, as usual, to bind and secure the line when locked in the form; but whenever lines of scroll form or other irregular curvature are to be formed, two suitably-curved rules, A and C, are so connected together as to support or clamp the types along the sides of the line, as well as at the ends, as shown in Fig. 2. I have shown the method of accomplishing this in Fig. 2, where the lips *a'* of the rule A are again bent to form catches or hooks for holding the rule C firmly against the base of the types. The rule C has, in addition, an inward spring, as indicated, to cause it to bind on the types by reason of its own elasticity.

If desired, the lips *a'* of the rule A may be bent upon a curve, instead of being bent at right angles; but I prefer to bend them at right angles, as shown.

What I claim as my invention, and desire to secure by Letters Patent, is—

1. A device for supporting a line of type, composed of the rules A B, between which the type are held, and lips or catches *a' a'*, which support the line at the ends, and also serve as clamps for holding the parts A B in place.

2. The printer's rule A, formed with laterally-projecting flanges *a'* upon its ends, substantially as and for the purpose specified.

3. The combination of the rule or brace C or B with the rule A, having flanges or catches *a'* formed upon its ends, substantially as hereinbefore specified.

In testimony whereof I have signed my name to the foregoing specification in the presence of two subscribing witnesses.

CHAS. N. MORRIS.

Witnesses:
B. EDW. J. ELLS,
W. BRADFORD.